US008849206B2

(12) United States Patent
Kennedy

(10) Patent No.: US 8,849,206 B2
(45) Date of Patent: *Sep. 30, 2014

(54) METHODS AND APPARATUSES FOR CONFIGURATION AUTOMATION

(71) Applicant: Apple Inc., Cupertino, CA (US)

(72) Inventor: Peter J. Kennedy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/145,571

(22) Filed: Dec. 31, 2013

(65) Prior Publication Data

US 2014/0113567 A1 Apr. 24, 2014

Related U.S. Application Data

(60) Continuation of application No. 13/794,225, filed on Mar. 11, 2013, now Pat. No. 8,660,494, which is a continuation of application No. 13/030,936, filed on Feb. 18, 2011, now Pat. No. 8,401,476, which is a division of application No. 12/730,991, filed on Mar. 24, 2010, now Pat. No. 8,355,673, which is a division of application No. 10/805,144, filed on Mar. 19, 2004, now Pat. No. 7,715,790.

(51) Int. Cl.
H04B 7/00 (2006.01)
H04W 88/06 (2009.01)
H04M 1/725 (2006.01)
H04B 1/38 (2006.01)
H04M 1/00 (2006.01)

(52) U.S. Cl.
CPC ............ H04M 1/7253 (2013.01); H04W 88/06 (2013.01); H04M 1/72572 (2013.01); H04M 1/006 (2013.01)

USPC .......................... 455/41.2; 455/41.3; 455/557

(58) Field of Classification Search
CPC ...................................................... H04W 88/06
USPC ............... 455/41.2, 41.3, 445, 461, 566, 557, 455/552.1; 715/700
See application file for complete search history.

(56) References Cited

U.S. PATENT DOCUMENTS

| 5,630,159 | A | 5/1997 | Zancho |
| 6,208,854 | B1 | 3/2001 | Roberts et al. |
| 6,477,374 | B1 | 11/2002 | Shaffer et al. |
| 6,987,988 | B2 | 1/2006 | Uchiyama |
| 7,124,167 | B1 | 10/2006 | Bellotti et al. |
| 7,171,221 | B1 | 1/2007 | Amin et al. |
| 7,624,834 | B2 | 12/2009 | Hofbeck et al. |
| 7,975,028 | B2 | 7/2011 | Ryan et al. |
| 8,401,476 | B2 * | 3/2013 | Kennedy ...................... 455/41.2 |

* cited by examiner

Primary Examiner — Eugene Yun
(74) Attorney, Agent, or Firm — Park, Vaughan, Fleming & Dowler LLP; Anthony P. Jones

(57) ABSTRACT

Methods and apparatuses for automated configuring of user preferences. In one aspect of the present invention, a method to operate a data processing system, includes: detecting whether or not a portable device is connected to the data processing system; and automatically configuring one or more user preferences of the data processing system according to an identity of the portable device in response to a change in whether or not the portable device is connected to the data processing system. In one aspect of the present invention, call forwarding of at least one of a land line phone and a mobile phone is automatically configured when the mobile phone is brought close to the land line phone or when the mobile phone is taken away from the land line phone.

22 Claims, 8 Drawing Sheets

METHODS AND APPARATUSES FOR CONFIGURATION AUTOMATION

RELATED APPLICATIONS

This application is a continuation of co-pending U.S. patent application Ser. No. 13/794,225, filed Mar. 11, 2013, which is a continuation of U.S. patent application Ser. No. 13/030,936, filed Feb. 18, 2011, now U.S. Pat. No. 8,401,476, which is a divisional of U.S. patent application Ser. No. 12/730,991, filed on Mar. 24, 2010, now U.S. Pat. No. 8,355,673, which is a divisional of U.S. patent application Ser. No. 10/805,144, filed on Mar. 19, 2004, now issued as U.S. Pat. No. 7,715,790. Each of these applications is incorporated by reference.

FIELD

The invention relates to configurable devices and systems, such as telephone systems, data processing systems, and others.

BACKGROUND

Digital data processing brings flexibility to many systems such that they can be configured according to the preferences of individual users. Different users may have different preferences. Further, one user may have different preferences under different situations. These flexible systems can be configured to meet the needs of individual users under different situations.

For example, call forwarding is a well known feature of many telephone systems. Call forwarding of a telephone system allows a user of a phone at a given phone number to dial a specific sequence on the phone to cause the telephone system to forward incoming calls addressed to the phone number to another specified phone number indicated by the dialed sequence. After call forwarding is turned on, the telephone system automatically forwards the calls until another sequence is dialed on the phone to turn off call forwarding. For example, on a phone at (321) 890-7654 a user may dial sequence #967*1230984567, which includes access code #967* for turning on call forwarding and the target phone number (123) 098-4567, to which the calls are forwarded. Thus, call forwarding for phone line (321) 890-7654 is turned on; and, incoming calls for (321) 890-7654 are forwarded to (123) 098-4567. To stop forwarding calls to (123) 098-4567, sequence #968# can be dialed on the phone (321) 890-7654.

Call forwarding may be unconditional. When unconditional call forwarding is turned on for a phone line, all incoming calls for the phone line are forwarded unconditionally to the phone number specified by the user. Call forwarding may also be conditional. For example, incoming calls can be forwarded to the specified phone number if the line is busy. Similarly, incoming calls can be forwarded to the specified phone number if the incoming calls are not answered (e.g., after the fourth ring). Thus, in this description, it is understood that call forwarding may refer to unconditional call forwarding or conditional call forwarding.

One example of a configurable system is powered seats in cars. For example, some cars are equipped with powered seats. An on-board computer of a car can remember the preferred seat positions for different drivers. When a driver selects one of the remembered preferences (e.g., by pressing a button representing the remembered preference), the powered seat automatically goes to the remembered position according to the data stored in the memory. Thus, after the on-board computer is instructed to remember the preferred seat position of a driver, the selected seat position for the driver can be easily recovered after any seat adjustment (e.g., adjusted for use by a different driver).

Another example of a configurable system is a desktop computer. For example, a computer system provides many user preferences (e.g., font size, window size, colors, etc.), which are adjustable for individual users. However, individually customizing these preferences can be tedious and time consuming.

SUMMARY OF THE DESCRIPTION

Methods and apparatuses for automated configuring of user preferences are described here. Some of the embodiments of the present invention are summarized in this section.

In one aspect of the present invention, a method to configure telephone services, includes: detecting whether or not a first phone and a second phone are positioned in a close relation (e.g., a close physical proximity) with respect to each other; and, automatically configuring a call forwarding service of the first phone in response to a change in whether or not the first phone and the second phone are positioned in the close relation with respect to each other. In one example of an embodiment, a call forwarding service of the second phone is also automatically configured in response to the change. In one example, a sequence is dialed to start forwarding calls of the first phone to the second phone when the first phone and the second phone are positioned in the close relation with respect to each other; and a sequence is dialed to stop forwarding calls of the first phone to the second phone when the first phone and the second phone are not positioned in the close relation with respect to each other. For example, a mobile phone is automatically configured to start call forwarding to a land line phone when the mobile phone is brought close to the land line phone and to stop call forwarding when taken away from the land line phone. In one example of an embodiment, a sequence is dialed to start forwarding calls of the first phone to the second phone when the first phone and the second phone are not positioned in the close relation with respect to each other; and a sequence is dialed to stop forwarding calls of the first phone to the second phone when the first phone and the second phone are positioned in the close relation with respect to each other. For example, a land line phone is automatically configured to start call forwarding to a mobile phone when the mobile phone is not close to the land line phone and to stop call forwarding when the mobile phone is brought close to the land line phone. In one example of an embodiment, the first phone and the second phone are positioned in the close relation with respect to each other when the first phone and the second phone are in radio communication (e.g., according to IEEE 802.11 or IEEE 802.15 standards). In one example of an embodiment, the first phone and the second phone are positioned in the close relation with respect to each other when one of the first phone and the second phone is connected to a control device with one of: a wired link, an infrared link, and a low power radio link. The control device may be integrated within or co-located with one of: the first phone and the second phone.

In one aspect of the present invention, a method to operate a data processing system, includes: detecting whether or not a portable device is connected to the data processing system; and, automatically configuring one or more user preferences of the data processing system according to an identity of the portable device in response to a change in whether or not the portable device is connected to the data processing system.

For example, the portable device may be a mobile phone, a personal digital assistant (PDA), or a portable digital music player. A connection between the portable device and the data processing system may be through a cable, a radio link, or a infrared link. In one example of an embodiment, the portable device includes a cellular phone; the data processing system includes a connection to a phone line; and, the data processing system configures a call forwarding service of the phone line in response to a change in whether or not the cellular phone is connected to the data processing system. In one example of an embodiment, data for configuring the one or more user preferences is loaded from the portable device into the data processing system in response to a change from the portable device being not connected to the data processing system to the portable device being connected to the data processing system. In one example of an embodiment, data stored on the data processing system for configuring the one or more user preferences is identified according to the identity of the portable device in response to a change in whether or not the portable device is connected to the data processing system. For example, an identity of a user of the data processing system is associated with the identity of the portable device, which is used to identify the data for configuring the one or more user preferences.

In one aspect of the present invention, a method to control a phone line, includes: automatically configuring the phone line to start call forwarding to a mobile phone when one or more communication links to the mobile phone are lost; and, automatically configuring the phone line to stop call forwarding to the mobile phone when a communication link to the mobile phone is re-established. For example, the communication link may be a radio link in accordance with a standard for Wireless Personal Area Networks (WPAN). In one example of an embodiment, a mobile phone number is received from the mobile phone when the communication link to the mobile phone is established; and the mobile phone number is stored for turning on call forwarding when the communication link is broken.

In one aspect of the present invention, a method implemented on a mobile phone, includes: automatically dialing a sequence on the mobile phone to start call forwarding to a phone line when a communication link to a device is re-established; and, automatically dialing a sequence on the mobile phone to stop call forwarding to the phone line when one or more communication links to the device are lost. In one example of an embodiment, the communication link is a radio link in accordance with a standard for Wireless Personal Area Networks (WPAN) (e.g., Bluetooth, or a WiFi standard such as IEEE 802.11). For example, the device may be a land line phone. In one example of an embodiment, a phone number of the phone line is received from the device when the first communication link to the device is established; and the phone number is dialed on the mobile phone to start call forwarding to the phone line. In one example of an embodiment, the mobile phone communicates with the device to place or receive phone calls at the mobile phone through the phone line. For example, when the mobile phone is within a range of a communication link to a land line phone, the mobile phone is automatically configured as a cordless handset of the land line phone.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
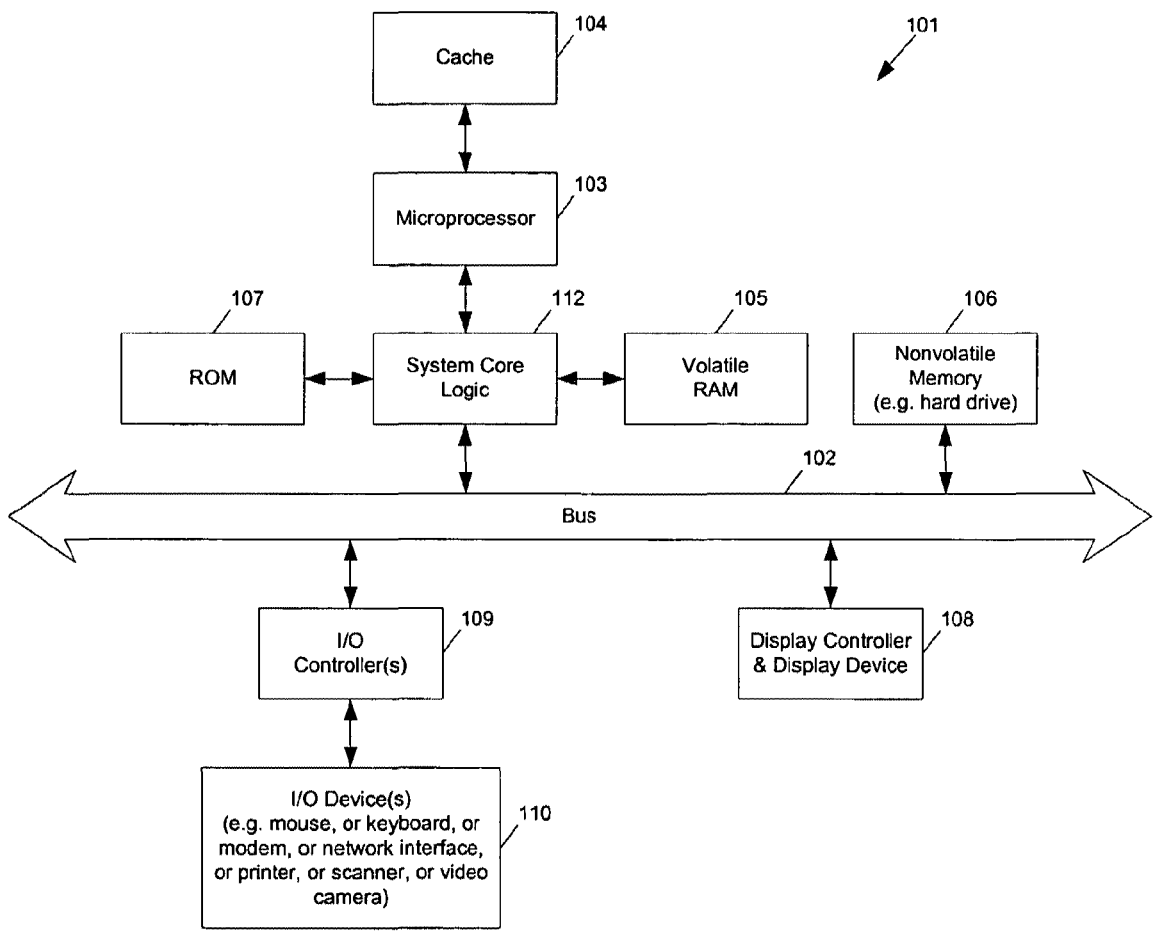
FIG. 1 shows a block diagram example of a data processing system which may be used with the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

Typically, to set a phone to forward incoming calls requires an overt action on the part of the user to dial a sequence (e.g., #967* followed by the target phone number) each time the user wants to turn call forwarding on. It also requires another overt action on the part of the user to rescind call forwarding when the user wants to turn call forwarding off.

In one embodiment of the present invention, a land line phone and a mobile phone (e.g., a cellular phone) with different phone numbers are equipped with communication devices (e.g., Bluetooth chips, wire connection ports, infrared ports) to recognize and establish the proximity of each other. The land line phone and the mobile phone can then be programmed to automatically configure call forwarding services according to the proximity condition.

For example, in one embodiment of the present invention, the land line phone is programmed to recognize the physical presence of the mobile phone in its vicinity (e.g., within a range of 3 or 10 meters when a Bluetooth radio is used to detect the proximity condition). When the mobile phone and the land line phone are not close to each other (e.g., out of range for a Bluetooth radio connection), the mobile phone is typically with the user. Thus, the land line phone is automatically programmed to forward calls to the mobile phone (e.g., through dialing a sequence to turn on call forwarding of the land line phone). However, when the mobile phone and the land line phone are close to each other, the user can use the land line phone. Thus, when it is detected that the mobile phone and the land line phone are close to each other, the land line is programmed to automatically rescind call forwarding so that the land line phone rings to accept calls when an incoming call is received.

Bluetooth provides robust, low complexity, low power and low cost radio links for mobile devices. The Institute of Electrical and Electronics Engineers, Inc. (IEEE) used Bluetooth as the basis to develop IEEE 802.15 standard for Wireless Personal Area Networks (WPAN). Bluetooth radio operates in the unlicensed ISM (Industrial, Scientific and Medical) band at 2.4 GHz. Low-power use of such a band is allowed without a license. Bluetooth provides a short range (e.g., 10 centimeters to 10 meter, extendible to 100 meters), frequency-hopping radio link between devices, designed to replace cable connections with radio links for mobile devices or fixed devices. The Bluetooth radio converts the digital baseband data to and from a 2.4 GHz analog signal using Gaussian Frequency Shift Keying (GFSK) modulation. Interference is avoided by hopping to a new frequency after transmitting or receiving a packet. By changing frequencies, many Bluetooth devices can use the same frequency band for wireless data communication. Bluetooth communication may transmit about 1 Megabit per second.

WiFi (Wireless Fidelity) is based on the IEEE 802.11b standard for Wireless Local Area Networking (WLAN). WiFi can be used at distances up to 305 meters (in open areas) between the transmitter and the receiver. WiFi can transmit data at a speed up to 11 Mbs Like Bluetooth, WiFi also uses spread spectrum frequency hopping and operates in the 2.4 GHz range. WiFi was designed to form computer networks without the need to run cables to individual computers. WiFi is compatible with existing Ethernet technology. Access points can be directly connected to existing wired networks.

Bluetooth radio or WiFi can be used to detect the physical presence of the mobile phone in the vicinity of the land line phone. However, other wired or wireless methods of detections can also be used, such as a serial or parallel cable connected to a cradle of a charger, infrared points on both the land line phone and the mobile phone, or other types of radio signals sent from the mobile phone to the land line phone.

Figure 2:
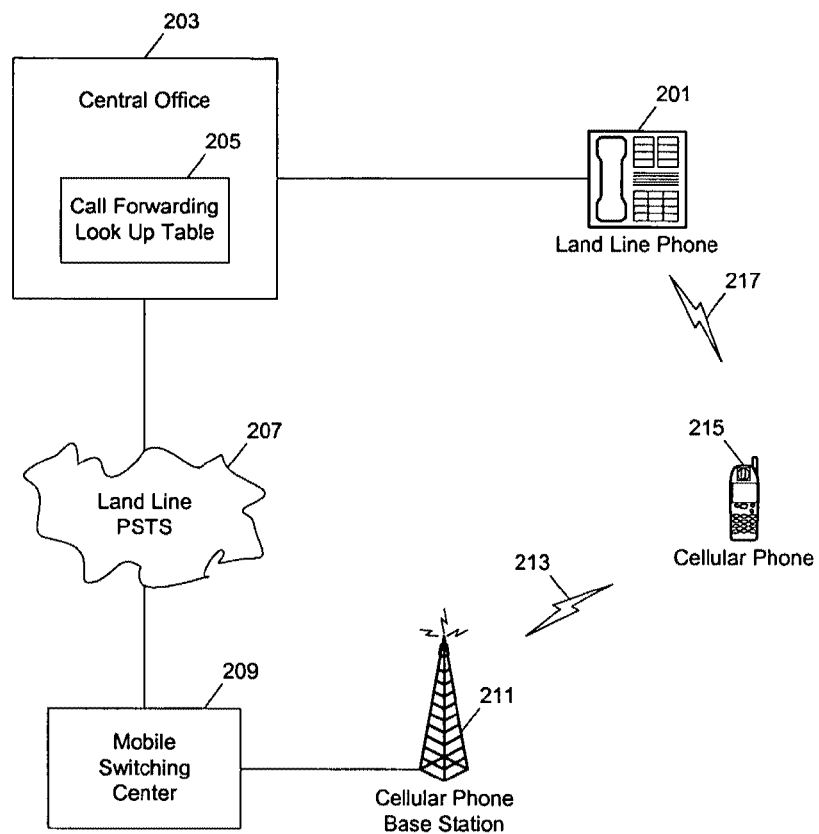
FIG. 2 illustrates an example phone system for automated configuring of call forwarding according to one embodiment of the present invention.

FIG. 2 illustrates an example phone system for automated configuring of call forwarding according to one embodiment of the present invention. In FIG. 2, land line phone 201 is connected to central office 203, which maintains look up table 205 for call forwarding. When a sequence is dialed on land line phone 201 to turn on call forwarding so that the incoming calls for the land line phone are forwarded to cellular phone 215, central office 203 updates look up table 205 so that the phone calls for land line phone 201 are routed (conditionally or unconditionally) to cellular phone 215, through land line Public Switched Telephone System (PSTS) 207, mobile switching center 209, cellular phone base station 211 and cellular communication link 213. When a sequence is dialed on land line phone 205 to turn off call forwarding, look up table 205 is updated accordingly so that the calls for land line phone 201 will be routed to land line phone 201. In one embodiment of the present invention, land line phone 201 automatically dials the sequence to forward calls to cellular phone 215 when the land line phone detects that cellular phone 215 is not in the vicinity of land line phone 201. For example, land line phone 201 and cellular phone 215 are both equipped with Bluetooth (or IEEE 802.15) chips so that when a Bluetooth radio link (e.g., link 217) between the two phones is broken, the land line phone automatically dials the sequence to start call forwarding to the cellular phone. When the Bluetooth radio link (e.g., link 217) between the two phones is re-established, the land line phone automatically dials the sequence to stop forwarding calls to the cellular phone. Thus, after the user pairs the cellular phone with the land line phone, the calls for the land line phone will be automatically configured to be forwarded to the cellular phone when the user leaves the land line phone with the cellular phone.

The proximity condition of the phones can be detected and established through automated detection and connection of communication links, such as cables, infrared, Bluetooth radio, WiFi, and other types of radios. For example, a cradle for cellular phone 215 may be used to charge the battery of the cellular phone and connect the cellular phone to handfree kits (e.g., headphone, speaker, microphone). In one embodiment, the cradle has a wire link to land line phone 201 so that, when the cellular phone is on the cradle, the land line phone automatically dials a sequence to turn off call forwarding. When the cellular phone is removed from the cradle, the land line phone automatically turns on call forwarding so that calls made to the land line's phone number are forwarded to the cellular phone's phone number. Similarly, the proximity condition can also be established using an infrared communication link. Alternatively, the cradle may be integrated with the land line phone. Alternatively, the cradle may not be connected to the land line phone. For example, the cradle is separate from the land line phone but connected to the phone line of the land line phone. Thus, when the cellular phone is placed on the cradle, the cradle automatically dials the sequence to turn off call forwarding of the land phone line (so that calls made to the land line's phone number are directed to the land line phone rather than the cellular phone); when the cellular phone is removed from the cradle, the cradle automatically dials the sequence to turn on call forwarding to the cellular phone (so that calls made to the land line's phone number are forwarded to the cellular phone's phone number). Thus, the circuitry for automated configuring of call forwarding may be integrated in the land line phone or located in a stand alone device that is hooked to the same phone line as the land line phone.

It is understood that the communication link between the land line phone and the cellular phone may be bi-directional or unidirectional. For example, a unidirectional link may be used to detect the physical presence of the cellular phone near the land line phone or a device connected to the phone line of the land line phone. For example, cellular phone 215 repeatedly broadcasts its identification using a radio signal. When cellular phone 215 is close to land line phone 201, the radio signal is detected by the land line phone, which automatically turns off call forwarding (or otherwise changes the configuration of call forwarding service). When the radio signal is not detectable by land line phone 201, the land line phone turns on call forwarding (or otherwise changes the configuration of call forwarding service). In another example, the communication link is simply a switch which is activated when a cellular phone is placed at a particular position (e.g., on the cradle). In one example, the land line phone verifies the identity of the detected cellular phone through the communication link so that only the cellular phone that is paired with the land line phone can cause the automated configuring of call forwarding of the land line.

Further, in one embodiment, call forwarding of cellular phone 215 can also be automatically configured according to the proximity condition. For example, when cellular phone 215 is close to land line phone 201, cellular phone 215 automatically dials a sequence to start call forwarding to land line phone 201. In certain embodiments, rather than changing the call forwarding setting automatically without any user input or feedback from the user, the phone may display a question to the user which allows the user to provide input or feedback. For example, the phone may display a question to the user (such as "Do you want to automatically change your call forwarding setting based on your established preferences?") and may also display a "yes" button or indicator and a "no" button or indicator. A selection or activation of the "yes" button by the user may then allow the phone to change the call forwarding setting automatically, and alternatively, a selection or activation of the "no" button by the user may then prevent the phone from automatically changing the call forwarding setting. In this way, the phone may have the change occur automatically (upon detecting that a proximity condition or other condition exists which should cause an automatic change if the user allows it) if the user, upon being prompted, agrees with the change. Further, in one embodiment, the phone may start a timer to activate a default selection in the absence of a user input. For example, a user is typically away from the phone if the condition to active the call forward of a land line phone to a mobile phone is detected when a Bluetooth link between the land line phone to the mobile phone is broken, in which case the land line phone may be configured to make the change (turning on the call forwarding from the land line phone to the mobile phone) in the absence of user input for a period of time; however, a user is provided with an opportunity to disagree with the change. In certain situations, the phone may make the change only after a user provides input to agree with the change. For example, after a mobile phone detects a land line phone through a Bluetooth link (e.g., obtaining the phone number of the land line phone), the mobile phone automatically activates call forwarding to the land line phone only after receiving user input that agrees with the change.

Figure 3:
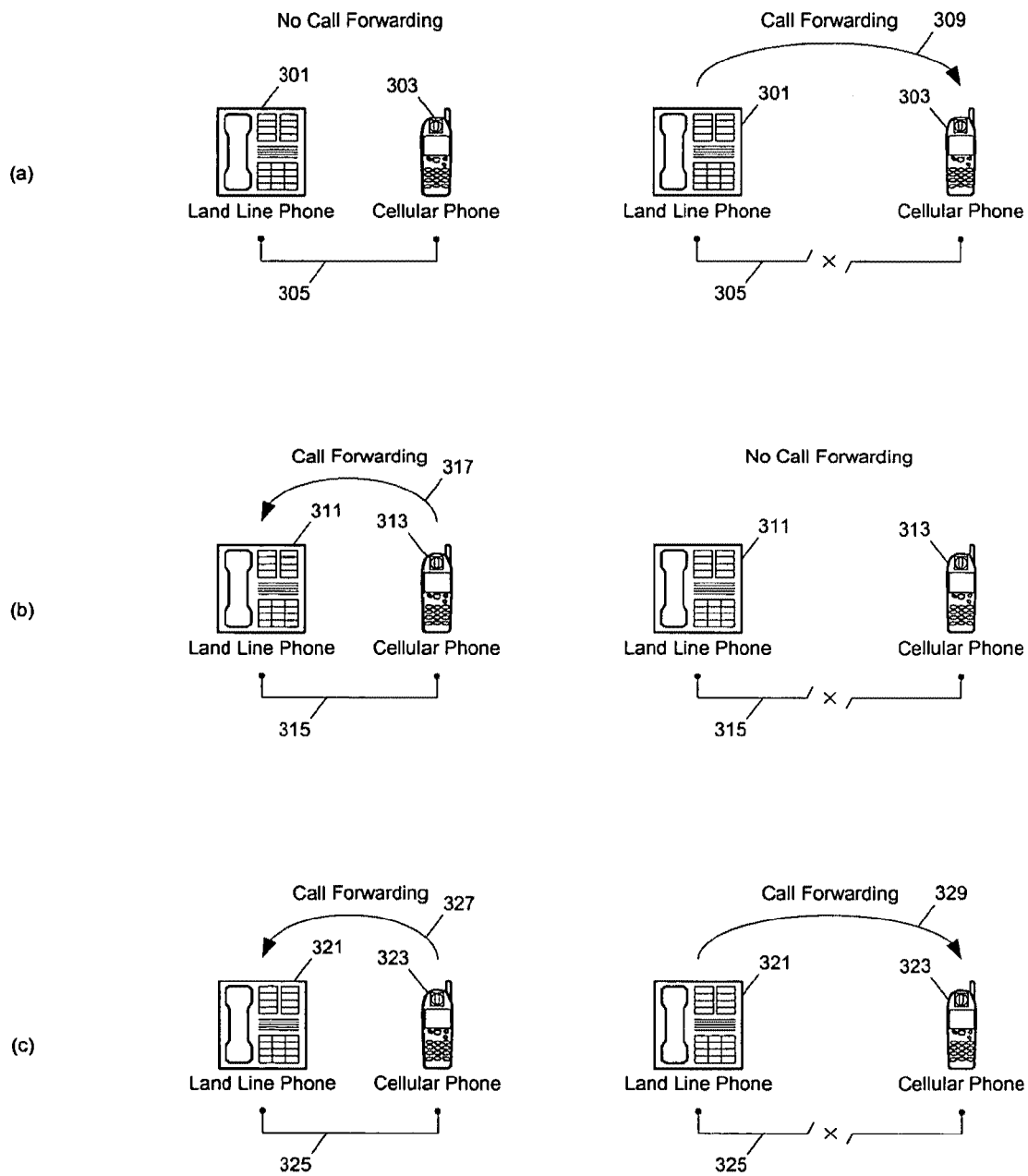
FIG. 3 illustrates example scenarios of automated configuring of call forwarding according to embodiments of the present invention.

FIG. 3 illustrates example scenarios of automated call configuring of forwarding according to embodiments of the present invention. In FIG. 3, scenario (a) illustrates a situation where call forwarding of land line phone 301 is automatically configured according to whether or not a short range communication connection (e.g., Bluetooth, WiFi, radio sensor, cable, infrared) between land line phone 301 and cellular phone 303 is broken. When connection 305 is re-established, call forwarding from land line phone 301 to cellular phone 303 is stopped. When connection 305 is broken, call forwarding (309) from land line phone 301 to cellular phone 303 is started. Thus, when the user carries cellular phone 303 away from land line phone 301, calls to the land line phone are forwarded, conditionally or unconditionally, to the cellular phone for the user. When the user takes the cellular phone back to the vicinity of the land line phone, call forwarding of the land line phone is stopped, since the use of the land line phone is preferred.

In FIG. 3, scenario (b) illustrates a situation where call forwarding of cellular phone 313 is automatically configured according to whether or not a short range communication connection (e.g., Bluetooth, WiFi, radio sensor, cable, infrared) between land line phone 311 and cellular phone 313 is broken. When connection 315 is re-established, call forwarding (317) from cellular phone 313 to land line phone 311 is started. When connection 315 is broken, call forwarding from cellular phone 313 to land line phone 311 is stopped. Thus, for example, when the land line phone and the cellular phone are close to each other, the phone calls for the cellular phone are automatically configured to be forwarded to the land line phone, since the use of the land line phone is preferred.

In one embodiment of the present invention, a number of cellular phones can be automatically configured to forward calls to the land line phone when they are all close to the land line phone. When multiple cellular phones (e.g., mobile phones of family members) are brought close to the land line phone (e.g., a home phone), they can all be automatically configured to forward calls to the land line phone. Further, in one embodiment, when the land phone line is busy, the land line phone instructs the cellular phones to automatically turn off call forwarding until the land phone line is free. When the land phone line is free again, the cellular phones that are close to the land line phone (e.g., having short communication links with the land line phone) again turn on call forwarding to the land line.

In one embodiment, when the communication link (e.g., the Bluetooth, cable, or infrared link) is established, the land line phone (e.g., 311) automatically communicates its phone number (or its identity) to the cellular phone (e.g., 313) so that the cellular phone can automatically determine the target phone number for call forwarding. Thus, when the cellular phone is brought close to one of a number of land line phones, the cellular phone can automatically configure to forward calls to the corresponding one of the land line phones, if the land line is not busy.

In one embodiment, the land line phone provides its phone number as an identification of the phone. Alternatively, the land line phone may provide its identity as a product serial number, a user defined identification number, a transmitter ID, or other types of identification numbers, which can be used by the cellular phone to identify the phone. Thus, the land line phone may not broadcast its phone number. The cellular phone user can program the cellular phone to associate the identity of the land line phone with its land line phone number. Thus, once programmed, the cellular phone automatically looks up the correct phone number according to the identity of the land line phone. Alternatively, the phone numbers are exchanged in a connection process.

In FIG. 3, scenario (c) illustrates a situation where call forwarding of both land line phone 321 and cellular phone 323 are automatically configured according to whether or not a communication connection (e.g., Bluetooth, WiFi, radio sensor, cable, infrared) between land line phone 321 and cellular phone 323 is broken. When connection 325 is re-established, call forwarding (327) from cellular phone 323 to land line phone 321 is started, while call forwarding of land line phone 321 to cellular phone 323 is stopped. When connection 325 is broken, call forwarding from cellular phone 323 to land line phone 321 is stopped, while call forwarding (329) of land line phone 321 to cellular phone 323 is started. Thus, for example, when the land line phone and the cellular phone are physically close to each other (e.g., detected through Bluetooth radio), the phone calls for the cellular phone are automatically configured to be forwarded (e.g., unconditionally) to the land line phone so that phone calls for both the land line phone and the cellular phone are routed to the land line phone. When the land line phone and the cellular phone are not close to each other, the phone calls for the land line phone are automatically configured to be forwarded (e.g., conditionally upon no answer) to the cellular phone so that phone calls for the land line phone may be routed to the cellular phone (e.g., if not answered).

Thus, in these examples when both the cellular phone and the land line phone are within the reach of a user, the use of the land line phone is preferred. When the land line phone is not reachable to the user but the cellular phone is, the calls to the land line phone are forwarded to the cellular phone. In an automated call forwarding configuring process according to one embodiment of the present invention, it is assumed that the cellular phone moves with the user. It will be appreciated that alternative arrangements for the forwarding may be used (e.g., the cell phone may be preferred, etc.)

Figure 4:
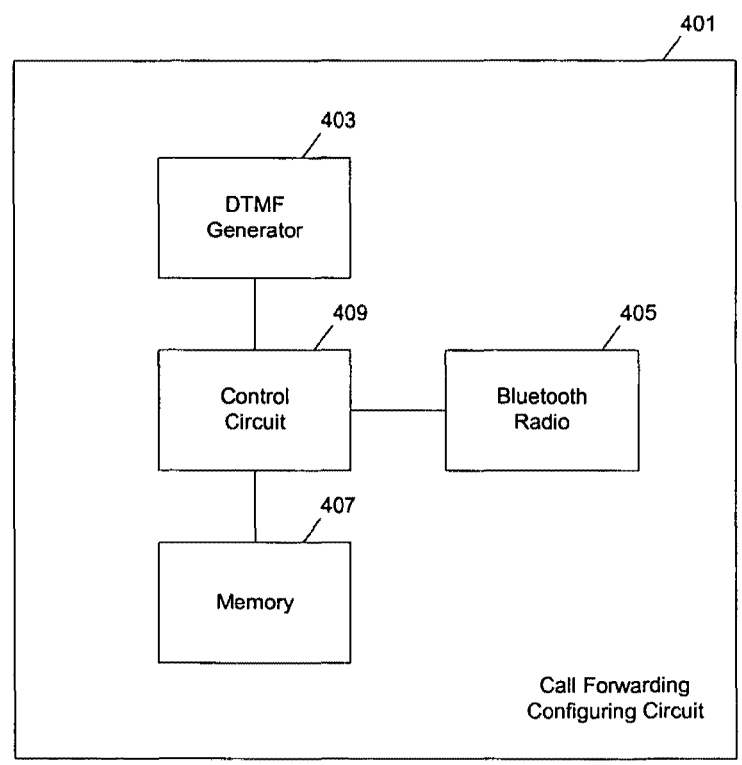
FIG. 4 illustrates a device for automated configuring of call forwarding according to one embodiment of the present invention.

FIG. 4 illustrates a device for automated configuring of call forwarding according to one embodiment of the present invention. Call forwarding configuring circuit 401 includes Dual Tone Multi-Frequency (DTMF) generator 403, memory 407, Bluetooth radio 405 and control circuit 409. Bluetooth radio 405 detects whether or not a Bluetooth enabled cellular phone is present in the vicinity of the Call forwarding configuring circuit. When a Bluetooth link between the Call forwarding configuring circuit and a cellular phone is re-established or lost, control circuit 409 causes DTMF generator 403 to generate signals on a phone line, corresponding to dialing a sequence to configure call forwarding. Memory 407 stores the sequences to be dialed to turn on or turn off call forwarding (e.g., #967*1230984567 and #968#). In one embodiment, Bluetooth radio 405 obtains the cellular phone number from the cellular phone when there is a Bluetooth connection. The cellular phone number is stored in memory 407 so that when Bluetooth radio 405 detects that the cellular phone is out of range, control circuit 409 causes DTMF generator 403 to dial a sequence according to the data stored in memory 407 to start call forwarding to the cellular phone. When the Bluetooth radio connection is re-established, control circuit 409 controls DTMF generator 403 to dial a sequence according to the data stored in memory 407 to stop call forwarding to the cellular phone. Alternatively, in one embodiment, the call forwarding access codes (e.g., #967* and #968#) are hard coded in the control circuit.

A similar circuitry can also be used on a cellular phone so that call forwarding of the cellular phone can be automatically configured depending on whether or not a Bluetooth connection to a device connected to a land phone line is broken.

Although some examples of devices for automated configuring of call forwarding are illustrated with a typically telephone system in which a Dual Tone Multi-Frequency (DTMF) generator (e.g., in a touch tone land line phone or mobile phone) generates signals to communicate with a central office for the configuring of call forwarding, it is understood that other types of communication methods and devices can also be used for the configuring of call forwarding services. A call forwarding configuring device is not limited to use DTMF signals on a phone line to communicate with the central office to configure the call forwarding services. In general, various communication signal types on different communication channels can be used for such a device to communicate requests to configure the call forwarding services to the central office. For example, a phone or a configuring device may communicate with a central office using a network communication protocol (e.g., through a digital subscriber line (DSL) or a digital cable broadband connection) to configure the call forwarding services. Further, a software program can use a general-purpose network connection (e.g., Internet through a cable connection, a phone line connection, a wireless telecommunication connection) to communicate with the central office for the configuring of the call forwarding service. Furthermore, a software program may indirectly communicate with the central office for the configuring of the call forwarding service. For example, a call forwarding configuring device may communicate with a server (e.g., through a network connection using a messaging protocol); and the server forwards the request for configuring the call forwarding service to the central office (e.g., through traditional means of DTMF signals, or through other communication channels, such as a dedicated network connection or Internet).

In FIG. 4, Bluetooth radio 405 is illustrated as an example method of detecting the proximity condition. Alternatively, other methods can also be used. For example, an infrared port (or WiFi, or cable port, or other radio link circuit) can be used to detecting proximity condition. Note that Call forwarding configuring circuit 401 can also be a part of a computer for interfacing with a phone line. The computer may further control the automated configuring of call forwarding according to other conditions, such as the time of the day, the day of the week, whether or not a user is logged into the system, etc. For example, it may be configured such that call forwarding may be activated only during a certain period of time (e.g., during the work hours). The content of memory 405 may be programmed through Bluetooth radio 405 or through a data bus. Alternatively, a DTMF decoder (not shown) can be used in the circuit, which monitors, decodes and stores the sequence that is dialed on the phone line during a set up process.

Although the above examples are illustrated using a land line phone and a cellular phone, from this description, it will be apparent to one skilled in the art that the methods and apparatuses of embodiments of the present invention can also be used for configuring call forwarding between land line phones or between mobile phones. For example, land line phones with cordless handsets may be automatically configured as the handsets are moved in or out a certain region. Similarly, automated call forwarding between mobile phones can also be performed as the mobile phones move close to or away from each other.

In one embodiment of the present invention, a mobile phone is a combined cellular phone and handset of a cordless phone. A conventional cordless phone typically includes a base unit and a handset. The base unit communicates with the handset cordlessly (wirelessly) through a radio link. The base unit is typically connected to a land phone line. The handset is typically handheld by a user to conduct a phone conversation. In one embodiment of the present invention, when the mobile phone is within a range of the base unit, the mobile phone is automatically configured as a handset of a cordless phone. For example, after the mobile phone automatically dials a sequence to start call forwarding of the mobile phone line to the corresponding land phone line, the mobile phone communicates with the base unit to answer or place calls using the land phone line. When the mobile phone is outside the range of the base unit, the mobile phone automatically switches into the mobile phone mode, dialing a sequence to stop call forwarding to the land phone line. In the mobile phone mode, the mobile phone answers or places calls using the mobile phone line.

Figure 5:
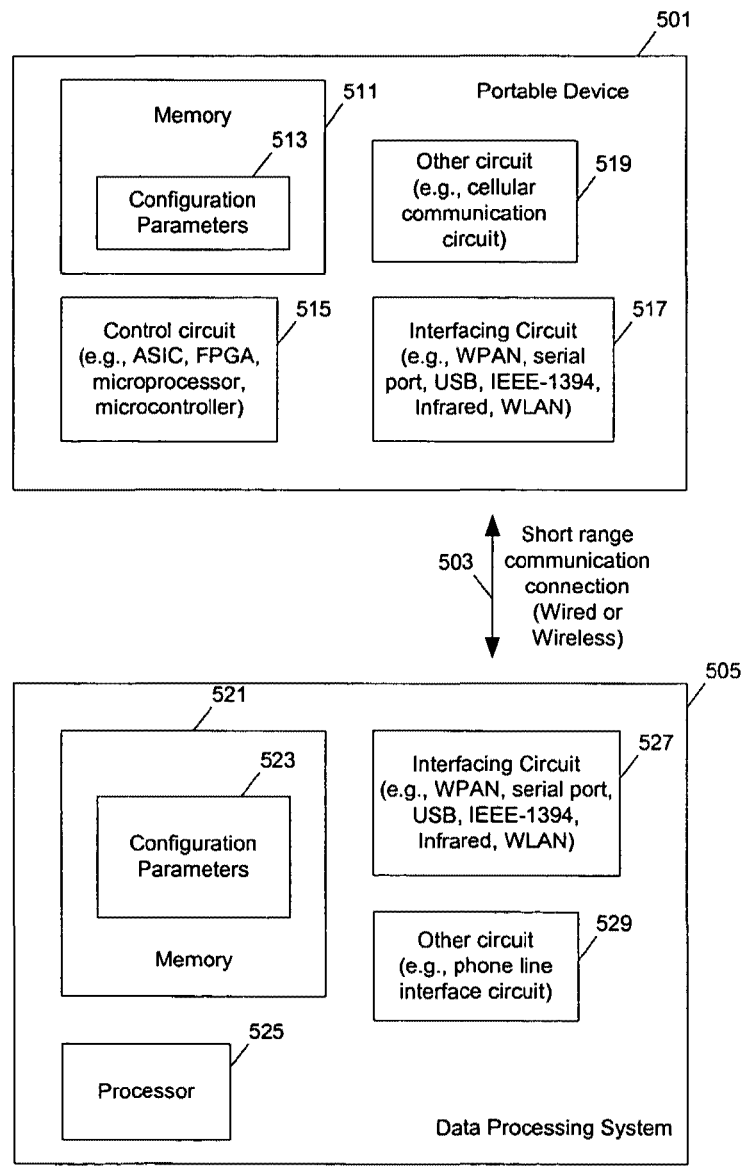
FIG. 5 illustrates a system which automatically configures user preferences according to one embodiment of the present invention.

In one embodiment of the present invention, a data processing system automatically configures user preferences according to a proximity condition of a portable device. FIG. 5 illustrates a system which automatically configures user preferences according to one embodiment of the present invention. In FIG. 5, data processing system 505 contains memory 521, which stores configuration parameters 523. Processor 525 controls data processing system 505 to perform various tasks (e.g., using other circuit 529, such as phone line interface circuit). Data processing system 505 contains interface circuit 527 for establishing an automated short range communication link with a portable device, such as device 501. Portable device 501 contains control circuit 515 (e.g., Application-Specific Integrated Circuit (ASIC), Field-Programmable Gate Array (FPGA), microprocessor, microcontroller) to control the operation of portable device 501. Memory 511 stores configuration information 513, which can be used to configure data processing system 505 according to the preferences of the user of portable device 501. Interface circuit 517 is used to establish short range communication connection 503 (wired or wireless). Communication connection 503 is automatically established when portable device 501 is positioned with respect to the data processing system (e.g., within the radio range, or in a cradle). Portable device may include other circuit 519 (e.g., cellular communication circuit), which can perform tasks without a communication link with data processing system 505. For example, the portable device can be a cellular phone, a personal digital assistant (PDA), or a portable digital music player (e.g., an iPod from Apple Computer, Inc.)

In one embodiment of the present invention, when the short range communication connection is established and maintained, it is determined that portable device 501, which may be a cellular phone, and data processing system 505, which may be a land line phone system, are in close proximity. Thus, data processing system 505 automatically configures user preferences according to an identity of portable device 501. For example, data processing system 529 automatically dials a number to stop forwarding calls from a land line phone number to a cellular phone number. When portable device 501 and data processing system 505 are not in close proximity, data processing system 505 automatically configures user preferences according to the identity of portable device 501. For example, data processing system 505 automatically dials a number to start forwarding calls from the land line phone number to the cellular phone number.

In one example, data processing system 505 may control the position of a car seat. Configuration parameters 523 may be adjusted as the driver adjusts the position the car seat to remember the preferences. In one embodiment of the present invention, the preferences of the driver (e.g., the car seat position, the minor positions, and other settings of the driver) are linked to the identity of portable device 501. When the short range communication connection is established, data processing system 505 automatically adjusts the car seat position, mirror positions and other user preferences accordingly. For example, when the cellular phone (or a PDA) of the driver of the car is placed on the cradle before the car is started, data processing system 505 identifies the cellular phone with the driver so that the seat position, minor positions and other settings are adjusted automatically. Further, in one embodiment, the preference data (e.g., configuration parameters 523) can be loaded from data processing system 505 into portable device 501 (e.g., during a set up process) so that when the portable device is connected to the data processing system, the configuration parameters stored in the portable device can be loaded into the data processing system to configure the user preferences.

In another example, data processing system 505 may be used by different users (e.g., software developers). Adjusting various user preferences, such as setting window sizes, colors, fonts, background, arrangement of the icons, and others, can be time consuming and tedious. In one embodiment of the present invention, the user preference is loaded into portable device 501 from data processing system 505 during a set up (or update) process. When the short range communication connection is re-established, data processing system 505 automatically uses the configuration parameters stored in the portable device to set up user preferences for the user of the portable device. When the connection is broken, data processing system 505 may automatically adjust the preferences to a predetermined condition. Thus, the user can easily carry the data for configuring the user preferences with the portable device, which may be used with a number of similar data processing systems. For example, the user may use one of a number of computers. When the portable device is connected (e.g., through a wired or wireless communication channel) to any one of the computers, the computer automatically configures user preferences for the user according to the portable device.

Figure 6:
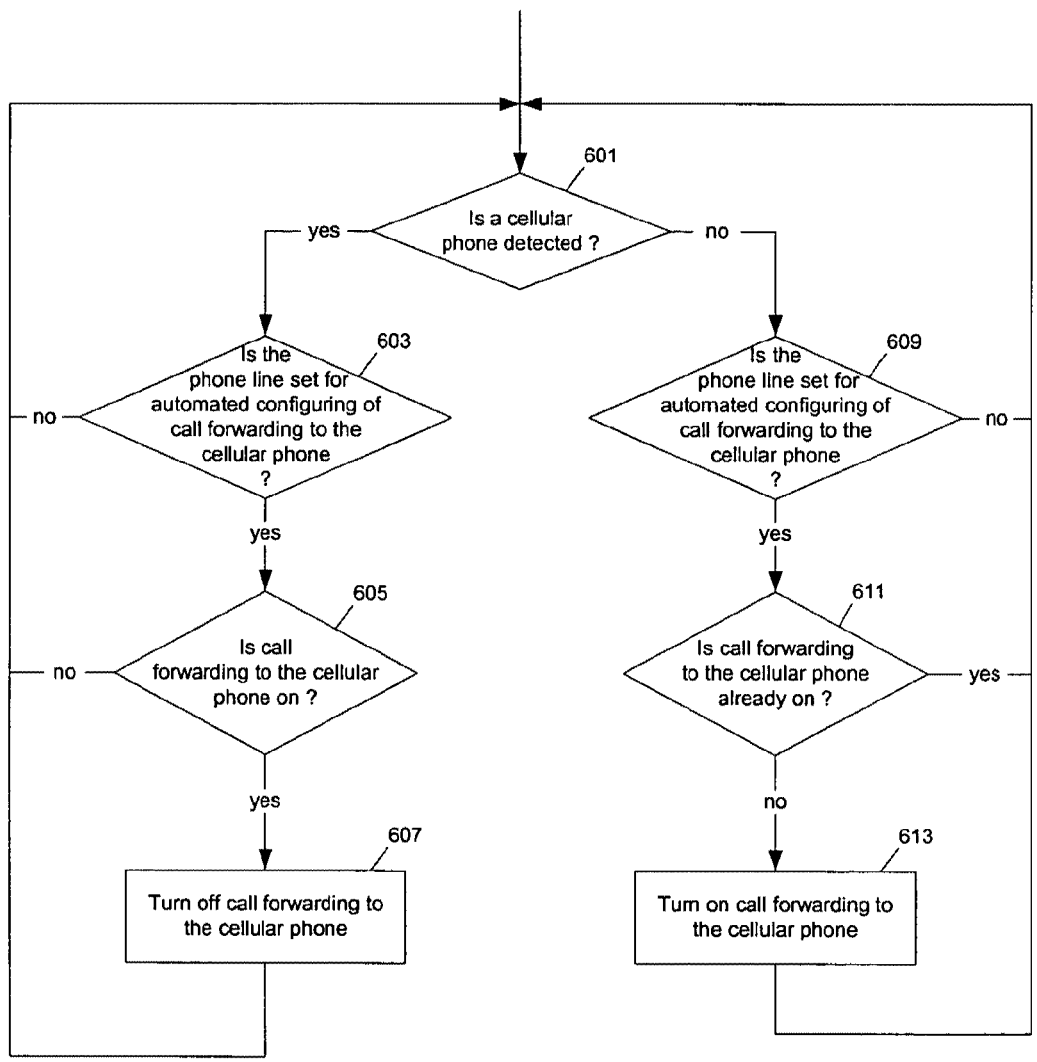
FIG. 6 illustrates a method to automatically configure call forwarding of a land phone line according to one embodiment of the present invention.

FIG. 6 illustrates a method to automatically configure call forwarding of a land phone line according to one embodiment of the present invention. Operation 601 determines whether or not a cellular phone is detected (e.g., detected by a land line phone, or a device connected to the land line). If a cellular phone is detected, operation 603 determines if the phone line is set for automated configuring of call forwarding to the cellular phone. If the phone line is set for automated configuring of call forwarding to the cellular phone and call forwarding to the cellular phone is on (605) (e.g., no action has been performed to turn off call forwarding to the cellular phone), operation 607 automatically turns off call forwarding to the cellular phone (e.g., automatically dial an number, such as #968#, using the land line). However, if the phone line is not set for automated configuring of call forwarding to the cellular phone but set for a different cellular phone, call forwarding will not be turned off.

If the cellular phone is not detected (e.g., moved out of range, or removed from the cradle) and the phone line is set for automated configuring of call forwarding to the cellular phone (609), operation 611 determines if call forwarding to the cellular phone is already on. If call forwarding to the cellular phone is not already on (e.g., no action has been performed to turn on call forwarding), operation 613 automatically turns on call forwarding to the cellular phone (e.g., automatically dials a sequence, such as #967* followed by the cellular phone number). However, if the cellular phone that is carried away is not the specific cellular phone paired with the land line for automated configuring of call forwarding, the disconnection of the communication link will not cause call forwarding to be turned on.

Figure 7:
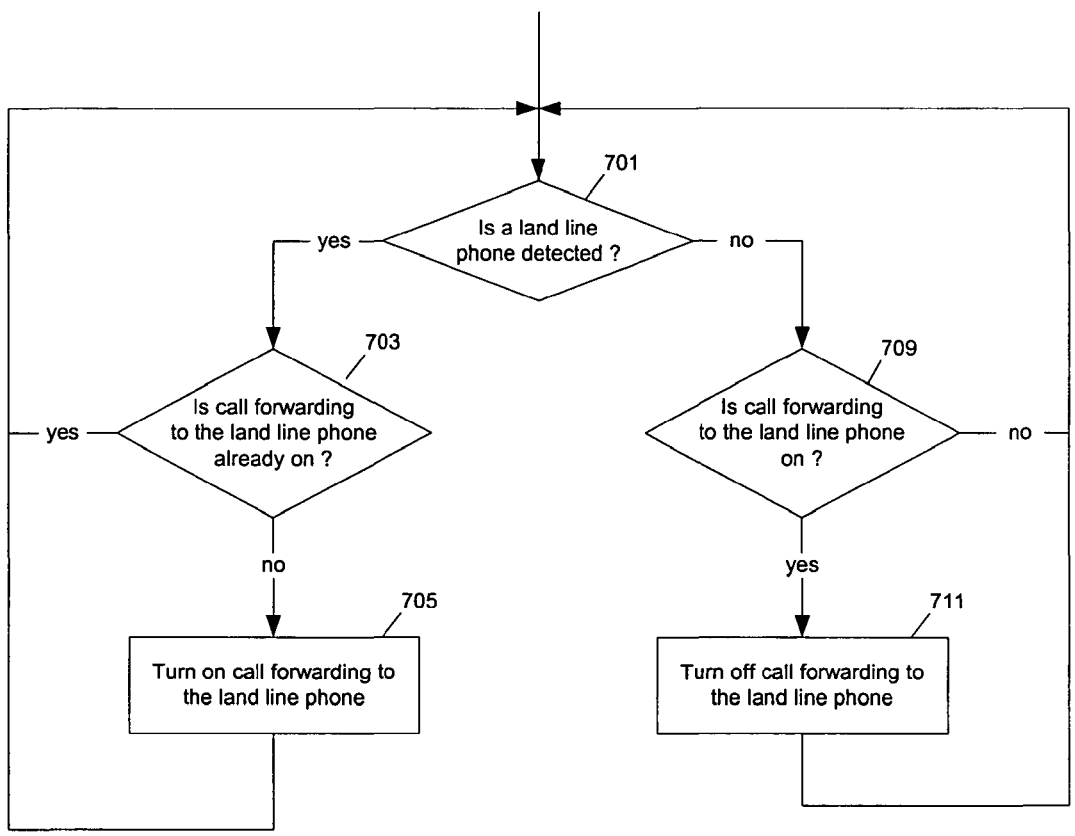
FIG. 7 illustrates a method to automatically configure call forwarding of a cellular phone according to one embodiment of the present invention.

FIG. 7 illustrates a method to automatically configure call forwarding of a cellular phone according to one embodiment of the present invention. Operation 701 determines whether or not a land line phone is detected. If a land line phone is detected and call forwarding to the land line phone is not already on (703), operation 705 automatically turns on call forwarding of the cellular phone to the land line phone. In one embodiment, a land line phone (or a device representing the land line phone) communicates the land line phone number to the cellular phone (e.g., through a Bluetooth or serial communication connection) so that the cellular phone can automatically configure call forwarding to the corresponding land line phone. In one embodiment, an identity of the land line phone is communicated through the communication link to the cellular phone, which determines whether or not to turn on call forwarding to the land line phone according to the identity of the land line phone.

When there is no land line phone detected, the cellular phone automatically turns off call forwarding to a land line phone (711), if call forwarding to the land line phone is on (709).

In one embodiment, the cellular phone automatically turns off (or does not turn on) call forwarding to the land line phone when the short range communication link between the land line phone and the cellular phone suggests that the land line phone is busy. Only when the land line phone is not in use (e.g., as indicated by a message, a signal or a command on the communication link from the land line phone), the cellular phone automatically turns on call forwarding to the land line phone.

Figure 8:
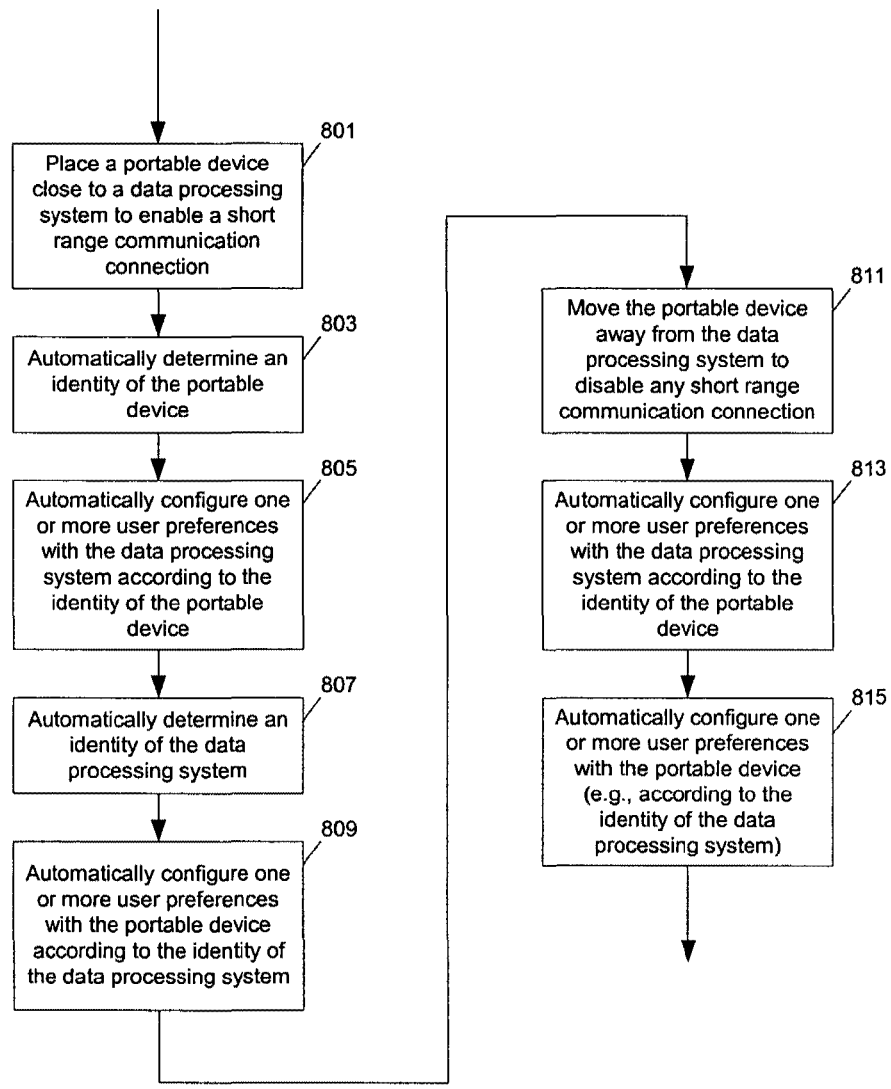
FIG. 8 illustrates a method for automated configuring of user preferences according to one embodiment of the present invention.

FIG. 8 illustrates a method for automated configuring of user preferences according to one embodiment of the present invention. Operation 801 places a portable device close to a data processing system to enable a short range communication connection between the data processing system and the portable device. In one embodiment of the present invention, the data processing system and the portable device are configured to automatically establish the communication link when the portable device is placed (or moved) into such a position. For example, the portable device, such as a mobile phone, a Personal Digital Assistant (PDA) (e.g., a palm computer), or a portable digital music player (e.g., an iPod from Apple Computer, Inc.), may be moved into a range for Bluetooth radio connection with the data processing system, placed on a cradle connected to the data processing system, or positioned to have an infrared port facing the infrared port of the data processing system. After operation 803 automatically determines an identity of the portable device, operation 805 automatically configures one or more user preferences with the data processing system according to the identity of the portable device. For example, a device connected to a land line automatically determines the identity of a mobile phone to turn off call forwarding to the mobile phone if call forwarding to the mobile phone is on. In another example, an on-board computer instructs one or more motors to automatically adjust the seat position according to the identity of the cellular phone (or a PDA) of the driver. In a further example, a computer automatically configures the user preferences according to the identity of the cellular phone (or a PDA) of the current user. In one embodiment, the data processing system loads information (e.g., the phone number, seat positions, preferences parameters) from the portable device to automatically configure the user preferences. After operation 807 automatically determines an identity of the data processing system, operation 809 automatically configures one or more user preferences with the portable device according to the identity of the data processing system. For example, a cellular phone automatically determines the phone number of a land line phone to turn on call forwarding to the land line phone. Operation 811 moves the portable device away from the data processing system to disable any short range communication connection between the portable device and the data processing system. For example, the portable device may be taken out of a cradle connected to the data processing system and moved out of a range for Bluetooth radio connection with the data processing system. Operation 813 automatically configures one or more user preferences with the data processing system according to the identity of the portable device. For example, a land line is automatically configured to call forwarding to a cellular phone when the user takes the cellular phone away from the land line phone. In one embodiment, the data processing system loads and stores information (e.g., the phone number, preferred seat position when the driver exits the car) from the portable device when the communication link is established so that, when the portable device is disconnected from the data processing system, the loaded information can be used to configure the user preference. Operation 815 automatically configures one or more user preferences with the portable device (e.g., according to the identity of the data processing system). For example, a cellular phone turns off call forwarding to a land line if short range communication links to this land line are lost.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems (e.g., a cellular phone or a portable digital music player or a PDA) which have fewer or more components may also be used with the present invention. The computer system of FIG. 1 may, for example, be an Apple Macintosh computer.

As shown in FIG. 1, the computer system 101, which is a form of a data processing system, includes a bus 102 and system core logic 112 which interconnect a microprocessor 103, a ROM 107, and volatile RAM 105 and a non-volatile memory 106. The microprocessor 103, which may be, for example, a G3 or G4 or G5 microprocessor from Motorola, Inc. or IBM is coupled to cache memory 104 as shown in the example of FIG. 1. The bus 102 and system core logic 112 interconnect these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive, a magnetic optical drive, or an optical drive (e.g., a DVD RAM), or other type of memory system which maintains data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device that is coupled to the data processing system through a network interface such as a modem or Ethernet interface. The bus 102 may include one or more buses connected to one another through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM), random access memory (RAM), magnetic disk storage media, optical storage media, flash memory devices, etc.), as well as electrical, optical, acoustical or other forms of propagated signals (e.g., carrier waves, infrared signals, digital signals, etc.), etc.

In one embodiment, I/O devices 110 include at least one port for connection with a portable device (e.g., a mobile phone, a PDA), such as an infrared port, a serial port, a USB port, an IEEE-1394 port, a WLAN port (e.g., WiFi), a WPAN port (e.g., Bluetooth). In one embodiment, I/O devices 110 include a circuit to generate signals on a phone line to turn on or turn off call forwarding. In one embodiment, I/O devices 110 include an interface circuit to control motors of a powered car seat.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
   at a portable device that includes first circuitry for communicating using a first wireless protocol and second circuitry for communicating using a second wireless protocol, wherein the first wireless protocol is a short range wireless protocol, wherein the second wireless protocol is usable to place and receive telephone calls over a cellular network, and wherein the first wireless protocol and the second wireless protocol are different, performing operations for:
   connecting to a data processing system, wherein the data processing system includes a graphical user interface; and
   transmitting, using the first wireless protocol, user data from the portable device to the data processing system in response to the connecting, wherein the data processing system is adapted to configure a setting of the graphical user interface in response to receiving the user data.

2. The method of claim 1, wherein the connecting comprises:
   detecting the data processing system with the first circuitry; and
   connecting to the data processing system using the first circuitry.

3. The method of claim 1, wherein the setting of the graphical user interface includes at least one of window sizes; colors; fonts; background; and arrangement of icons.

4. The method of claim 1, wherein the data processing system is in a car.

5. A method, comprising:
   at a data processing system that includes a display for displaying a graphical user interface and a wireless circuit for communicating according to a first wireless protocol, wherein the first wireless protocol is a short range wireless protocol, performing operations for:
   connecting to a portable device that communicates using the first wireless protocol and a second wireless protocol, wherein the second wireless protocol is usable to place and receive telephone calls over a cellular network, and wherein the first wireless protocol and the second wireless protocol are different;
   receiving, using the first wireless protocol, user data from the portable device; and
   configuring a setting of the graphical user interface of the data processing system in response to receiving the user data.

6. The method of claim 5, wherein the data processing system is part of a car.

7. The method of claim 5, wherein connecting to the portable device comprises coupling the portable device to the data processing system with a wire.

8. The method of claim 5, wherein the connecting to the portable device comprises wirelessly coupling the portable device to the data processing system.

9. The method of claim 5, wherein the setting of the graphical user interface comprises adjusting at least one of window sizes, colors, fonts, background, and arrangement of icons.

10. The method of claim 1, wherein the portable device is a cellular phone.

11. The method of claim 5, wherein the portable device is a cellular phone.

12. A portable device, comprising:
    a processor;
    first circuitry for communicating using a first wireless protocol, wherein the first wireless protocol is a short range wireless protocol; and
    second circuitry for communicating using a second wireless protocol, wherein the second wireless protocol is usable to place and receive telephone calls over a cellular network, and wherein the first wireless protocol and the second wireless protocol are different;
    wherein the processor and the first circuitry perform operations for:
    connecting to a data processing system, wherein the data processing system includes a graphical user interface;
    transmitting, using the first wireless protocol, user data to the data processing system in response to the connecting, wherein the data processing system is adapted to configure a setting of the graphical user interface in response to receiving the user data.

13. The portable device of claim 12, wherein, when connecting to the data processing system, the processor and the first circuitry perform operations for:
    detecting the data processing system; and
    connecting to the data processing system.

14. The portable device of claim 12, wherein the setting of the graphical user interface includes at least one of window sizes; colors; fonts; background; and arrangement of icons.

15. The portable device of claim 12, wherein the portable device is a cellular phone.

16. The portable device of claim 12, wherein the data processing system is in a car.

17. A data processing system, comprising:
    a processor;
    a display for displaying a graphical user interface; and a wireless circuit for communicating using a first wireless protocol, wherein the first wireless protocol is a short range wireless protocol; and wherein the processor, the display, and the wireless circuit perform operations for:
- connecting to a portable device that communicates using the first wireless protocol and a second wireless protocol, wherein the second wireless protocol is usable to place and receive telephone calls over a cellular network, and wherein the first wireless protocol and the second wireless protocol are different;
- receiving, using the first wireless protocol, user data from the portable device; and
- configuring a setting of the graphical user interface in response to receiving the user data.

18. The data processing system of claim 17, wherein connecting to the portable device comprises coupling the portable device to the data processing system with a wire.

19. The data processing system of claim 17, wherein connecting to the portable device comprises wirelessly coupling the portable device to the data processing system.

20. The data processing system of claim 17, wherein the setting of the graphical user interface includes at least one of window sizes; colors; fonts; background; and arrangement of icons.

21. The data processing system of claim 17, wherein the portable device is a cellular phone.

22. The data processing system of claim 17, wherein the data processing system is in a car.

* * * * *